United States Patent
Ball et al.

(10) Patent No.: US 9,480,939 B2
(45) Date of Patent: Nov. 1, 2016

(54) UNDERDRAIN AND METHOD FOR TRANSFERRING FORCES AND DIRECTING FLOW

(71) Applicant: Xylem Water Solutions Zelienople LLC, Zelienople, PA (US)

(72) Inventors: Christopher J. Ball, Cranberry Township, PA (US); Brian J. Bates, Bridgenorth (CA); Howard J. Sweeney, McDonald, PA (US)

(73) Assignee: XYLEM WATER SOLUTIONS ZELIENOPLE LLC, Zelienople, PA (US)

( * ) Notice: Subject to any disclaimer, the term of this patent is extended or adjusted under 35 U.S.C. 154(b) by 140 days.

(21) Appl. No.: 14/196,620

(22) Filed: Mar. 4, 2014

(65) Prior Publication Data

US 2014/0251439 A1    Sep. 11, 2014

Related U.S. Application Data

(60) Provisional application No. 61/772,701, filed on Mar. 5, 2013.

(51) Int. Cl.
*B01D 35/02* (2006.01)
*E02D 19/00* (2006.01)
*B01D 24/24* (2006.01)
*B01D 24/46* (2006.01)
*B01D 24/26* (2006.01)

(52) U.S. Cl.
CPC ............... *B01D 35/02* (2013.01); *B01D 24/24* (2013.01); *B01D 24/266* (2013.01); *B01D 24/4631* (2013.01); *Y10T 137/0318* (2015.04); *Y10T 137/6991* (2015.04)

(58) Field of Classification Search
CPC    B01D 24/24; B01D 24/266; B01D 24/4631; B01D 24/4636
USPC .................... 210/274, 275, 279, 291, 293
See application file for complete search history.

(56) References Cited

U.S. PATENT DOCUMENTS

| 1,341,187 A | 5/1920 | McPheeters |
| 1,687,782 A | 10/1928 | Norton |
| 1,780,791 A | 11/1930 | Lenderink |
| 1,892,842 A | 1/1933 | Kimberling |
| 2,084,351 A | 6/1937 | Luce |
| 3,615,019 A | 10/1971 | Early, Jr. |

(Continued)

FOREIGN PATENT DOCUMENTS

| EP | 0507414 A2 | 10/1992 |
| EP | 1844832 A2 | 10/2007 |

(Continued)

*Primary Examiner* — Matthew O Savage
(74) *Attorney, Agent, or Firm* — The Webb Law Firm (57) ABSTRACT

An underdrain system for transferring forces and directing flow includes at least one underdrain block having a top wall, a bottom wall, and two side walls connecting the top wall to the bottom wall to define a block interior. An insert is disposed in the interior of the underdrain block. The insert includes force-transmitting buttresses spaced along an exterior of the insert that contacts the two side walls of the underdrain block and act to transfer downward forces acting on the top wall of the underdrain block and internal fluid forces acting on the insert to the side walls of the underdrain block. The force-transmitting buttresses can also direct hydraulic flow.

16 Claims, 7 Drawing Sheets

(56) References Cited

U.S. PATENT DOCUMENTS

| | | | |
|---|---|---|---|
| 5,019,259 A | 5/1991 | Hambley | |
| 5,118,419 A | 6/1992 | Evans et al. | |
| 5,149,427 A * | 9/1992 | Brown | B01D 24/24 |
| | | | 210/274 |
| 5,156,738 A | 10/1992 | Maxson | |
| 5,419,838 A | 5/1995 | DiTullio | |
| 5,639,384 A | 6/1997 | Brown et al. | |
| 5,865,999 A | 2/1999 | Shea et al. | |
| 6,129,482 A | 10/2000 | Ditullio | |
| 6,143,188 A | 11/2000 | Jantsch, Sr. et al. | |
| 7,063,787 B2 | 6/2006 | Jackson et al. | |
| 7,192,521 B2 | 3/2007 | St. Germain | |
| 7,326,351 B2 | 2/2008 | Hambley et al. | |
| D565,148 S | 3/2008 | Addison | |
| 7,410,578 B2 | 8/2008 | Hambley et al. | |
| 2004/0007541 A1 | 1/2004 | Stegge | |
| 2005/0109706 A1 | 5/2005 | Hambley et al. | |
| 2005/0133434 A1 | 6/2005 | Hambley et al. | |
| 2010/0314305 A1 | 12/2010 | Kadakia et al. | |
| 2011/0073549 A1 | 3/2011 | Geibel et al. | |
| 2013/0306542 A1 * | 11/2013 | Roberts | B01D 24/24 |
| | | | 210/274 |

FOREIGN PATENT DOCUMENTS

| | | |
|---|---|---|
| JP | 2010222819 A | 10/2010 |
| WO | 2011088447 A2 | 7/2011 |

* cited by examiner

UNDERDRAIN AND METHOD FOR TRANSFERRING FORCES AND DIRECTING FLOW

CROSS REFERENCE TO RELATED APPLICATIONS

This application claims the benefit of U.S. Provisional Application No. 61/772,701, filed Mar. 5, 2013, which is hereby incorporated in its entirety by reference.

BACKGROUND OF THE INVENTION

1. Field of the Invention

The present invention is directed to an underdrain system, and, in particular, an underdrain system and method for transferring forces and directing flow.

2. Description of Related Art

The main components of an underdrain system are filtering media and underdrain blocks. Underdrain blocks are generally square or rectangular in cross section and have a long longitudinal axis as compared to their cross section. They are attached end-to-end to form long sections called laterals. When using a mono-pour installation method, underdrain laterals are attached to a filter floor using a series of anchor rods, horizontal supports, and grouting. Filtering media sits atop these underdrain blocks. The underdrain system may also utilize a flume, a deeper channel set into the floor of the filter through which backwash fluid and, optionally, air may be introduced into the system.

Current molded plastic underdrains on the market do not have multiple protrusions or internal features along the inside of the underdrain block due to manufacturing requirements. The lack of internal features in the underdrain block greatly limits the strength of the overall assembly. Particularly, downward loads that are applied to the top of the underdrain during normal operation of the system cannot be transferred to the outside walls of the underdrain block and into the concrete fill material adjacent to the underdrain. The downward force must be taken up by the top deck of the underdrain block and any connecting walls of a primary chamber formed within the underdrain block. Further, internal pressure or forces exerted in the primary chamber of the underdrain block during the backwash sequence act on the walls of the primary chamber and any portion of the top deck surface of the underdrain block that is in direct connection to the primary chamber. However, no forces are transferred from the primary chamber to the vertical outside walls of the underdrain block during a backwash sequence.

In addition, the lack of internal features also limits the overall hydraulic performance of the system. For instance, a dual parallel underdrain includes a primary chamber and secondary chambers formed within the underdrain block. Fluid passes from the primary chamber into the secondary chamber through a series of orifices formed along the length of the primary chamber. Flow in the secondary chamber will balance or compensate prior to discharge through secondary chamber orifices. The balance and compensation of flow in the secondary chamber is critical to the overall performance of the system. Because current underdrain blocks lack internal features, it is difficult to dissipate the energy of fluid passing through the primary chamber water orifices, which limits the overall hydraulic performance of the system.

In view of the foregoing, a need exists for an underdrain system that is more effective at transferring forces and directing fluid flow.

SUMMARY OF THE INVENTION

In one embodiment according to the present disclosure, an underdrain system includes at least one underdrain block having a top wall, a bottom wall, and two side walls connecting the top wall to the bottom wall to define a block interior. An insert disposed in the block interior engages the top wall of the underdrain block. The insert includes force-transmitting buttresses spaced along an exterior of the insert that contact the two side walls of the underdrain block and act to transfer downward forces acting on the top wall of the underdrain block and internal fluid forces acting on the insert to the side walls of the underdrain block. The force-transmitting buttresses can be spaced along a portion of the exterior of the insert or along the entire length of the insert. The underdrain block can also include a primary chamber and secondary chambers. The force-transmitting buttresses can also direct hydraulic flow in the secondary chambers.

Further, the insert can be arch-shaped and can include liquid and gas orifices. The insert can have an engagement member that is adapted to engage the top wall of the underdrain block and form a fixed connection between the insert and the underdrain block. The insert can be made of a plastic or metal. For instance, in certain embodiments, the insert is made of plastic including, but not limited to, high-density polyethylene (HDPE), acrylonitrile butadiene styrene (ABS), and polyvinyl chloride (PVC).

In another embodiment according to the present disclosure, a method of transferring force exerted on an underdrain system includes positioning an underdrain system on a filter floor, the underdrain system includes at least one underdrain block having a top wall, a bottom wall, and two side walls connecting the top wall to the bottom wall to define an underdrain block interior, and an insert disposed in the underdrain block interior. The insert can engage the top wall of the underdrain block. The insert includes force-transmitting buttresses spaced along at least a portion of an exterior of the insert that contact the two side walls of the underdrain block. The method further includes exerting forces on the underdrain system and transferring the forces to the side walls of the underdrain block through the force-transmitting buttresses of the insert. The method can also include steps of providing grout along at least the side walls of the underdrain block and transferring the forces from the side walls of the underdrain block to grout positioned along the side walls. The forces exerted on the underdrain system include downward forces acting on the top wall of the underdrain block during a gravity filtration mode and internal fluid forces acting on the insert during a backwashing mode or an up-flow filtration mode.

In yet another embodiment according to the present disclosure, a method of directing fluid flow in an underdrain system includes positioning an underdrain system on a filter floor, the underdrain system includes at least one underdrain block having a top wall, a bottom wall, and two side walls connecting the top wall to the bottom wall to define an underdrain block interior, and an insert disposed in the underdrain block interior. The insert can engage the top wall of the underdrain block. The engagement can include a fixed connection between the insert and the top wall of the underdrain block. The insert includes force-transmitting buttresses spaced along at least a portion of an exterior of the insert that contact the two side walls of the underdrain block. A primary chamber and secondary chambers are formed within the interior of the underdrain block. The method further includes introducing fluid into the primary chamber, passing the fluid from the primary chamber into the secondary chambers, and dissipating energy of the fluid passing into the secondary chambers with the force-transmitting buttresses of the insert.

The insert can also include liquid and gas orifices where the fluid from the primary chamber can pass into the secondary chambers. The fluid can be introduced into the primary chamber during a backwashing mode or an up-flow filtration mode.

DETAILED DESCRIPTION OF THE INVENTION

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

Figure 1:
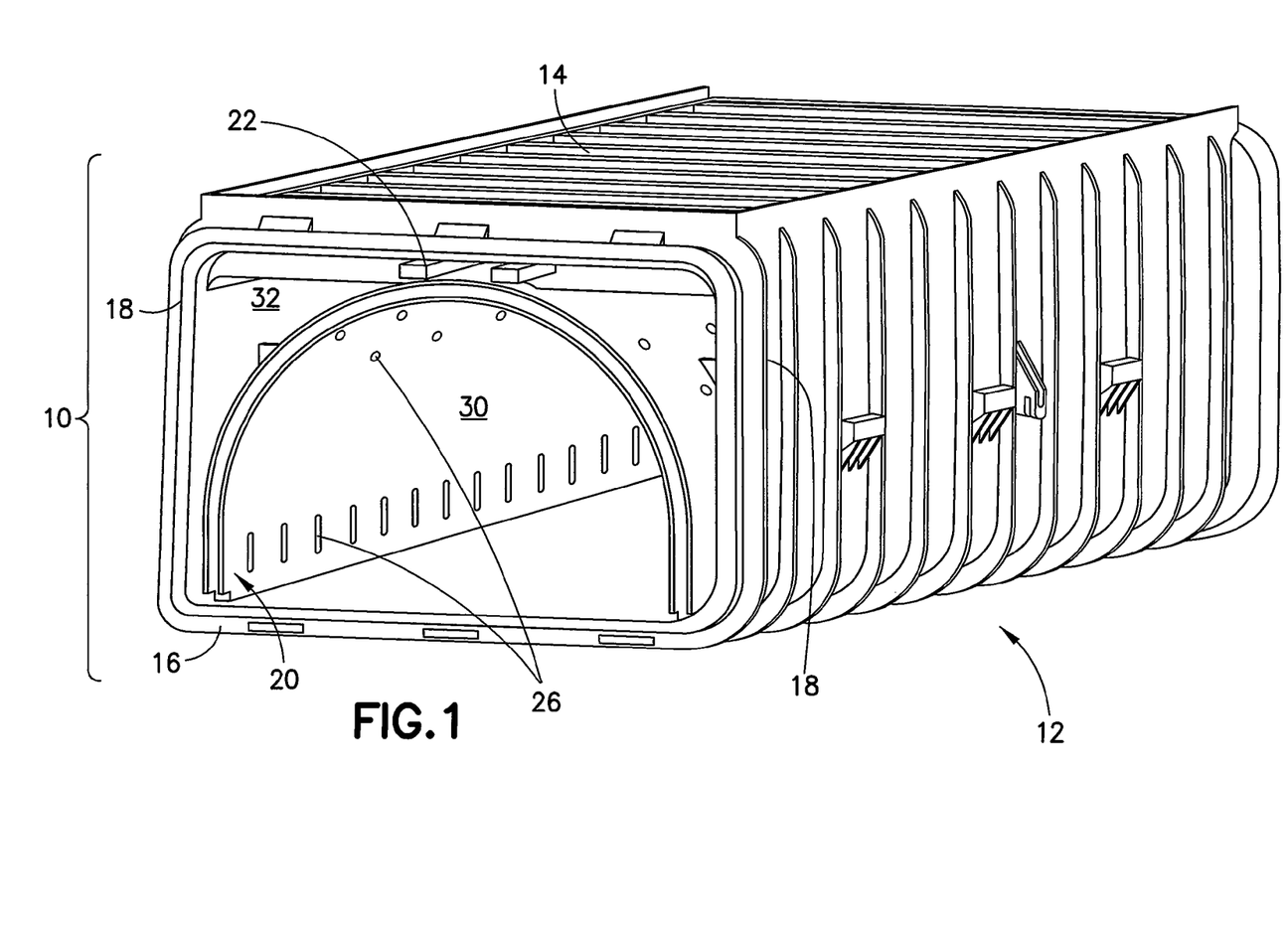
FIG. 1 illustrates a perspective of an underdrain block with an insert in accordance with an embodiment of the present invention.

Referring to FIG. 1, an underdrain system 10 in accordance with the present invention includes at least one underdrain block 12. The underdrain block 12 has a plurality of exterior walls including a top wall 14, a bottom wall 16, and a pair of side walls 18 extending between the top wall 14 and the bottom wall 16. The side walls 18 define a block interior. A layer or multiple layers of filter media (not shown) is poured on top of the underdrain block 12. The filter media acts to remove undesirable particles from a liquid that is being filtered through the underdrain system 10.

Figure 2:
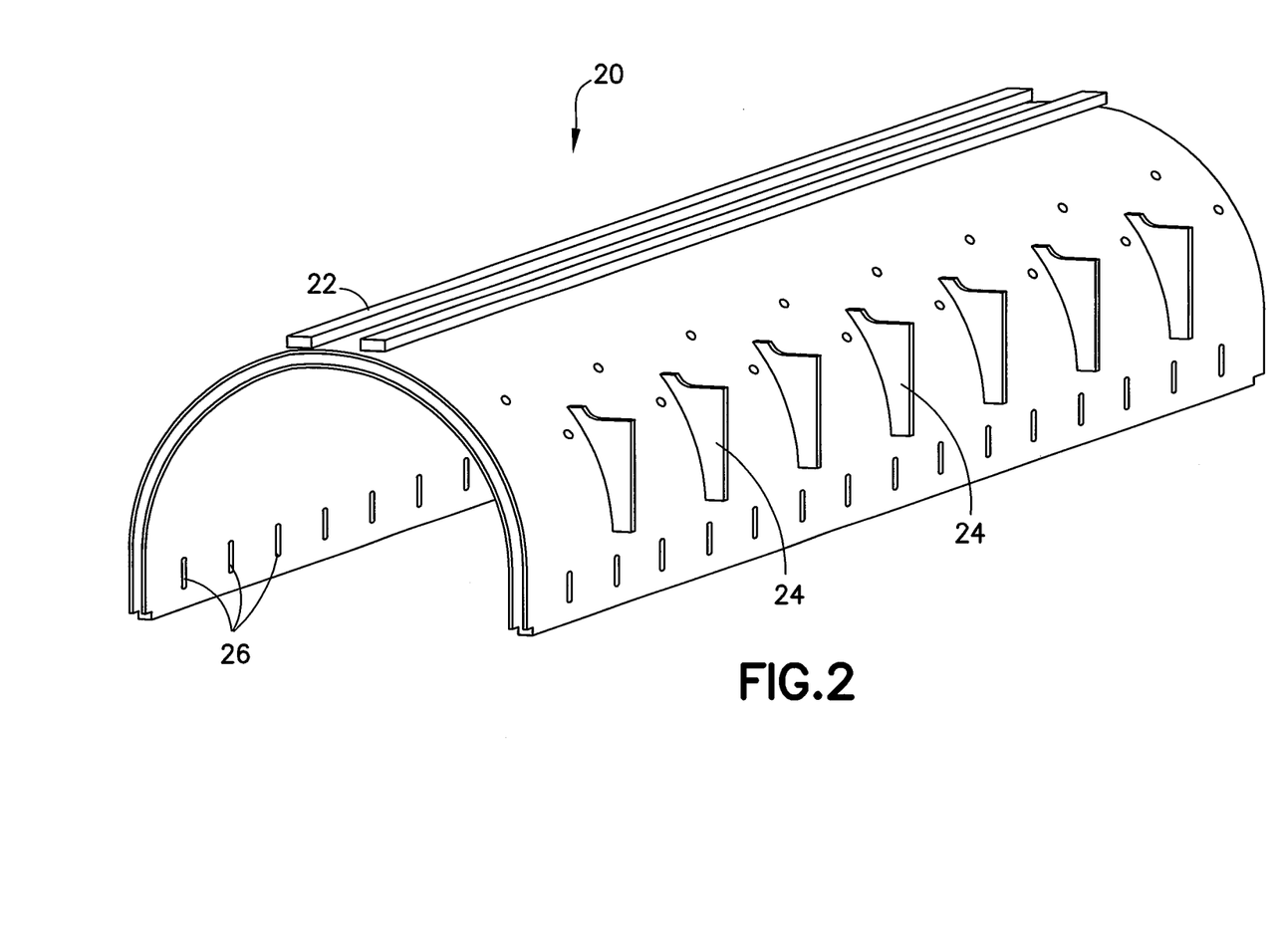
FIG. 2 illustrates a perspective view of the insert in accordance with an embodiment of the present invention.
Figure 3:
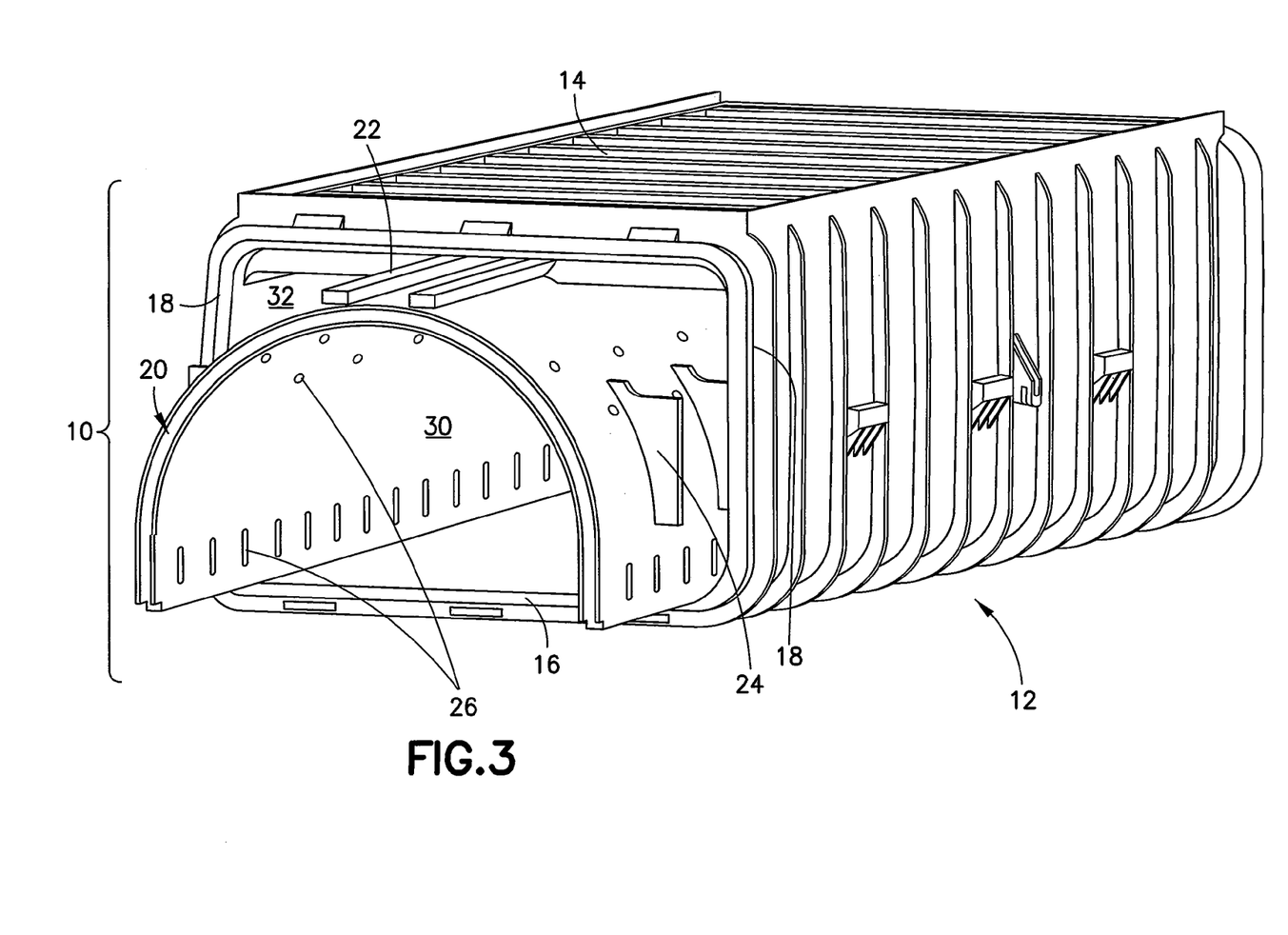
FIG. 3 illustrates a perspective view of an underdrain block with an insert partially installed in accordance with an embodiment of the present invention.

Referring again to FIG. 1, an insert 20 can be disposed within the interior of the underdrain block 12. In one embodiment, as shown in FIGS. 1-3, the insert 20 is arch-shaped. However, the insert 20 can have other polygonal shapes such as, for example, a trapezoidal shape. The insert 20 can also be made of a plastic or metal. For instance, in certain embodiments, the insert 20 is made of plastic including, but not limited to, high-density polyethylene (HDPE), acrylonitrile butadiene styrene (ABS), and polyvinyl chloride (PVC).

In certain embodiments, the insert 20 engages the interior of the underdrain block 12. In some embodiments, the insert 20 is fixedly engaged within the interior of the underdrain block 12, thereby forming a fixed connection to the underdrain block 12. For example, in one embodiment shown in FIGS. 1-3, the insert 20 can include an engagement member 22. In this embodiment, the underdrain block 12 can be configured to receive the engagement member 22 of the insert 20. As shown in FIG. 3, a slot formed along a bottom surface of the top wall of the underdrain block receives an engagement member on the insert to form a keyed connection between the underdrain block and the insert. Once disposed within the underdrain block 12, the insert 20 is secured within the interior of the underdrain block 12 through the engagement member 22, thereby forming a keyed connection between the insert 20 and the underdrain block 12. In certain embodiments, referring again to FIGS. 1-3, the engagement member 22 of the insert 20 is formed on a top exterior portion of the insert 20 and can engage a portion of the top wall 14 of the underdrain block 12. As such, a keyed connection is formed between the insert 20 and the top wall 14 of the underdrain block 12. It is appreciated that the keyed connection between the insert 20 and the underdrain block 12 can be formed by other means and in alternative locations on the insert 20 and the underdrain block 12.

Referring to FIGS. 2-7, the insert 20 can further include a plurality of force-transmitting buttresses 24. As used herein, "force-transmitting buttresses" refer to protrusions that are affixed to, and extend out from, the exterior of the insert 20. The force-transmitting buttresses 24 provide stability to the insert 20 and help transmit forces acting on the walls of the insert 20. In certain embodiments, the force-transmitting buttresses 24 are spaced along a portion of the exterior of the insert 20. In one embodiment shown in FIG. 2, the force-transmitting buttresses 24 are spaced along the entire length of the exterior of the insert 20. Further, as shown in FIGS. 1-3, the insert 20 can also include a plurality of orifices 26 distributed throughout the walls of the insert 20. The orifices 26 provide for the distribution of liquid and gas.

Figure 4:
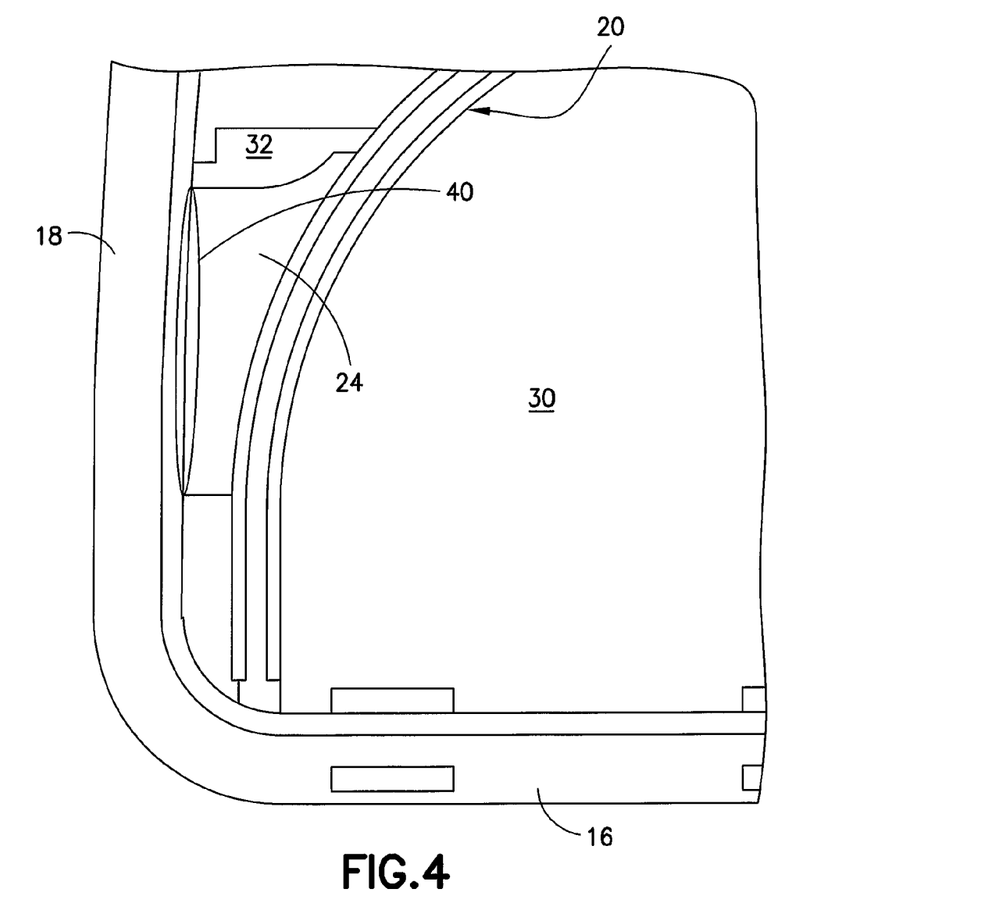
FIG. 4 illustrates an enlarged front view of the underdrain block sidewall and insert of FIG. 1.

During assembly of the underdrain system 10 according to the present invention, an insert 20 is placed into the interior of an underdrain block 12. The insert 20 can be connected to a portion of the underdrain block 12. As shown in FIGS. 1 and 3, this connection can be formed between the engagement member 22 of the insert 20 and the top wall 14 of the underdrain block 12. The force-transmitting buttresses 24 spaced along the exterior of the insert 20 contact the side walls 18 of the underdrain block 12. FIG. 4 shows an enlarged view of the contact between the force-transmitting buttresses 24 and a side wall 18 of the underdrain block 12. Referring to FIGS. 1-3, the walls of the insert 20 define a primary chamber 30 within the interior of the underdrain block 12. The walls of the insert 20 and the underdrain block 12 can also form secondary chambers 32 within the interior of the underdrain block 12. The orifices 26 distributed throughout the insert 20 allow for the transfer of gas and liquids between the primary chamber 30 and the secondary chambers 32. After the insert 20 is inserted into the underdrain block 12, a layer or multiple layers of filter media (not shown) is poured on top of the underdrain block 12.

The force-transmitting buttresses 24 of the insert 20 can be used to transfer various forces exerted on the underdrain system 10. For instance, in the filtration mode of a gravity filtration method, water comes downward through granular media poured onto the top wall 14 of the underdrain block 12. The water passes to secondary chambers 32 and then to primary chamber 30. Primary chamber 30 is connected to a collection flume, which in turn conveys the filtered liquid to a clearwell for distribution to the consumer. The filter media on top of the underdrain block 12 and water passing through exert a downward force onto the top wall 14 of the underdrain block 12. These downward forces are transferred from the top wall 14 of the underdrain block 12 to the insert 20 positioned in the underdrain block 12. In accordance with the present invention, these downward forces are then transferred to the side walls 18 of the underdrain block 12 by the force-transmitting buttresses 24 of the insert 20. The downward forces transferred to the side walls 18 of the underdrain block 12 can then be transferred to the surrounding grout material that is in direct contact with the side walls 18.

Figure 5:
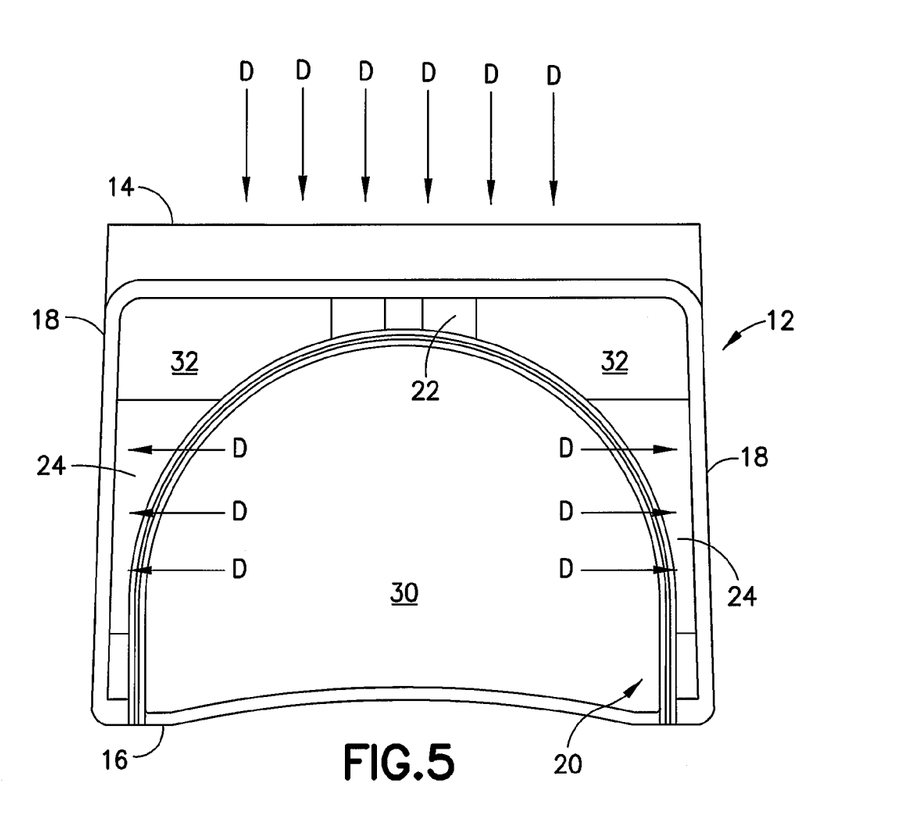
FIG. 5 illustrates a front view of the underdrain block and insert of FIG. 1 diagramming forces of weight.

FIG. 4 shows an enlarged view of the area where force is being transmitted 40 from the force-transmitting buttresses 24 of the insert 20 to a side wall 18 of the underdrain block 12. FIG. 5 shows the transfer of downward forces (designated as reference letter "D" in FIG. 5) from the top wall 14 of the underdrain block 12 to the side walls 18 of the underdrain block 12 with the use of the force-transmitting buttresses 24 of the insert 20.

Figure 6:
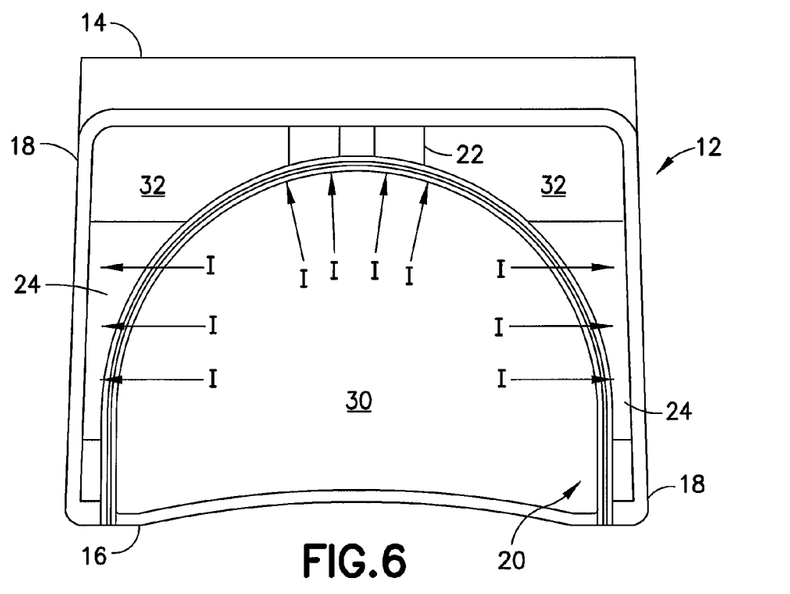
FIG. 6 illustrates a front view of the underdrain block and insert of FIG. 1 diagramming internal forces.

The force-transmitting buttresses 24 can also transfer internal forces during a backwash mode. In the backwash mode, clean water and air are pumped into the primary chamber 30. The water and air pumped into the primary chamber 30 are metered through the liquid and gas orifices 26 of the insert 20 into the secondary chambers 32. The backwash water and air are then pumped upward through the top wall 14 of the underdrain block 12 and through the granular media to dislodge dirt and foreign particles from the granular media. The backwash air and water being pumped into the primary chamber 30 create a large amount of internal pressure within the underdrain block 12 and exerts force directly on the insert 20. These internal forces are transferred to the side walls 18 of the underdrain block 12 by the force-transmitting buttresses 24 of the insert 20. The forces transferred to the side walls 18 of the underdrain block 12 can then be transferred to the surrounding grout material that is in direct contact with the side walls 18. FIG. 6 shows the transfer of internal forces (designated as reference letter "I" in FIG. 6) from the primary chamber 30 to the side walls 18 of the underdrain block 12 with the use of the force-transmitting buttresses 24 of the insert 20. As further shown in FIG. 6, in certain embodiments, the internal forces "I" can also be transferred to the underdrain block 12 through the engagement member 22 of the insert 20.

The force-transmitting buttresses 24 of the insert 20 also prevent the insert 20 from stretching when forces are exerted on the insert 20. For example, when internal forces are exerted on the insert 20 during backwashing, the force-transmitting buttresses 24 of the insert 20 provide structural support to the insert 20 and prevent the insert 20 from stretching or bending from these internal forces.

In addition to transferring forces, the force-transmitting buttresses 24 can also act as hydraulic baffles in the secondary chambers 32 to direct flow. As discussed above, during a backwash mode, fluid passes from the primary chamber 30 into the secondary chambers 32 through a series of orifices 26. Flow in the secondary chambers 32 will balance or compensate prior to discharge through secondary chamber orifices (not shown). As fluid passes into the secondary chambers 32, the fluid will continue to travel in the same direction as it did when it passed through the orifices 26. In accordance with the present invention, the fluid flowing through the orifices 26 will impact the force-transmitting buttresses 24 extending out from the insert 20. This will dissipate the energy of the fluid passing through the orifices 26 and redirect the flow of the fluid in the secondary chambers 32 causing a more even distribution of flow throughout the secondary chambers 32. As such, by using the force-transmitting buttresses 24 of the present invention, the balance and compensation of flow in the secondary chambers 32 are improved, thereby improving the overall performance of the underdrain system 10.

Figure 7:
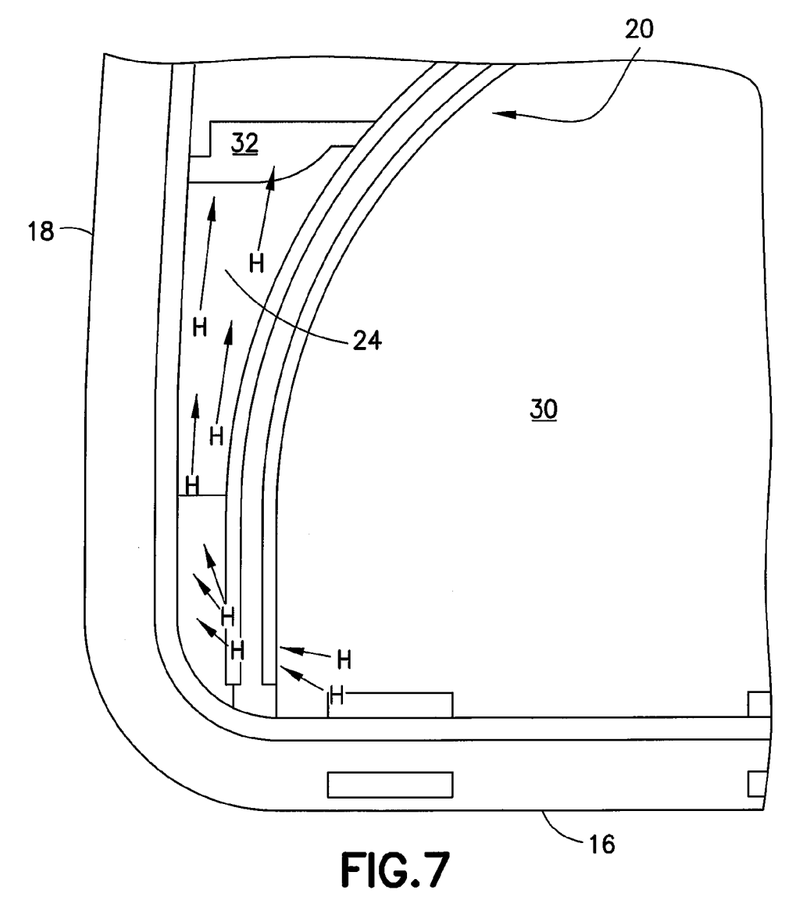
FIG. 7 illustrates an enlarged front view of the underdrain block and insert of FIG. 1 diagramming hydraulic flow.

FIG. 7 shows the hydraulic flow (designated as reference letter "H" in FIG. 7) of fluid into the secondary chambers 32. As shown in FIG. 7, fluid entering the secondary chambers 32 from the primary chamber 30 is redirected by the force-transmitting buttresses 24 of the insert 20.

In addition to gravity filtration, the present invention can be used in other filtration methods. For instance, the underdrain blocks 12 of the present invention can also be used for up-flow filtration. In an up-flow filtration method, water is introduced through a flume and then up through the underdrain blocks 12. The water then exits through the top of the underdrain blocks 12 and filter media. During up-flow filtration, air flows in at an air rate less than the typical air-scour rate used during backwashing. In one embodiment, during up-flow filtration, air flows in at an air rate of less than 1.5 standard cubic feet per minute per square foot of filter area (scfm/ft$^2$). The internal force and hydraulic flow are controlled using the force-transmitting buttresses 24 of the insert 20 in the same manner as described above. The underdrain system 10 of the present invention can be used to filter water and wastewater for both municipal and industrial applications.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the description. For example, it is to be understood that the present invention contemplates that, to the extent possible, one or more features of any embodiment can be combined with one or more features of any other embodiment.

The invention claimed is:

1. An underdrain system comprising:
   at least one underdrain block having a top wall, a bottom wall, and two side walls connecting the top wall to the bottom wall to define an underdrain block interior; and
   an insert disposed in the underdrain block interior, the insert comprising force-transmitting buttresses spaced along at least a portion of an exterior of the insert and contacting the two side walls of the underdrain block, the force-transmitting buttresses act to transfer downward forces acting on the top wall of the underdrain block and internal fluid forces acting on the insert to the side walls of the underdrain block,
   wherein a slot formed along a bottom surface of the top wall of the underdrain block receives an engagement member on the insert to form a keyed connection between the underdrain block and the insert.

2. The underdrain system of claim 1, wherein the underdrain block further comprises a primary chamber and secondary chambers.

3. The underdrain system of claim 2, wherein the force-transmitting buttresses direct hydraulic flow in the secondary chambers.

4. The underdrain system of claim 1, wherein the insert further comprises liquid and gas orifices.

5. The underdrain system of claim 1, wherein the insert comprises an arch-shaped insert.

6. The underdrain system of claim 1, wherein the force-transmitting buttresses are spaced along an entire length of the exterior of the insert.

7. The underdrain system of claim 1, wherein the insert comprises a material selected from plastic or metal.

8. The underdrain system of claim 7, wherein the insert is made of a plastic selected from the group consisting of high-density polyethylene (HDPE), acrylonitrile butadiene styrene (ABS), and polyvinyl chloride (PVC).

9. A method of transferring force exerted on an underdrain system, the method comprising:
    positioning an underdrain system on a filter floor, the underdrain system comprising at least one underdrain block having a top wall, a bottom wall, and two side walls connecting the top wall to the bottom wall to define an underdrain block interior;
    disposing an insert in the underdrain block interior such that a slot formed along a bottom surface of the top wall of the underdrain block receives an engagement member on the insert to form a keyed connection between the underdrain block and the insert, the insert comprising force-transmitting buttresses spaced along at least a portion of an exterior of the insert and contacting the two side walls of the underdrain block;
    exerting a force on the underdrain system; and
    transferring the force exerted on the underdrain system to the side walls of the underdrain block through the force-transmitting buttresses of the insert.

10. The method of claim 9, further comprising a step of providing grout along at least the side walls of the underdrain block.

11. The method of claim 10, further comprising a step of transferring the forces from the side walls of the underdrain block to grout positioned along the side walls.

12. The method of claim 9, wherein the forces comprise downward forces acting on the top wall of the underdrain block during a gravity filtration mode.

13. The method of claim 9, wherein the forces comprise internal fluid forces acting on the insert during a backwashing mode or an up-flow filtration mode.

14. A method of directing fluid flow in an underdrain system, the method comprising:
    positioning an underdrain system on a filter floor, the underdrain system comprising at least one underdrain block having a top wall, a bottom wall, and two side walls connecting the top wall to the bottom wall to define an underdrain block interior;
    disposing an insert in the underdrain block interior such that a slot formed along a bottom surface of the top wall of the underdrain block receives an engagement member on the insert to form a keyed connection between the underdrain block and the insert, the insert comprising force-transmitting buttresses spaced along at least a portion of an exterior of the insert and contacting the two side walls of the underdrain block, the insert forming a primary chamber and secondary chambers within the interior of the underdrain block;
    introducing fluid into the primary chamber;
    passing the fluid from the primary chamber into the secondary chambers; and
    dissipating energy of the fluid passing into the secondary chambers with the force-transmitting buttresses of the insert.

15. The method of claim 14, wherein the fluid from the primary chamber passes into the secondary chambers through liquid and gas orifices.

16. The method of claim 14, wherein the fluid is introduced into the primary chamber during a backwashing mode or an up-flow filtration mode.

* * * * *